United States Patent [19]

Jensen et al.

[11] Patent Number: 4,647,228
[45] Date of Patent: Mar. 3, 1987

[54] HEIGHT ADJUSTING DEVICE FOR MACHINES OR MACHINE ELEMENTS

[75] Inventors: Niels D. Jensen, Bjerringbro; Jan Jensen, Højbjerg, both of Denmark

[73] Assignee: Grundfos A/S, Bjerringbro, Denmark

[21] Appl. No.: 724,077

[22] Filed: Apr. 17, 1985

[30] Foreign Application Priority Data

Apr. 18, 1984 [DK] Denmark ............................ 2013/84

[51] Int. Cl.$^4$ ...................... F16C 23/02; F16C 25/02
[52] U.S. Cl. .................................. 384/420; 384/251; 384/425; 384/616; 384/626
[58] Field of Search ............... 308/2 R, 244; 384/247, 384/248, 250–252, 260, 263–265, 420, 424, 425, 590, 601, 602, 616, 620; 464/117, 147, 157; 411/535, 536

[56] References Cited

U.S. PATENT DOCUMENTS

| | | | |
|---|---|---|---|
| 1,239,057 | 9/1917 | Sparks | 384/251 |
| 1,827,811 | 10/1931 | Derrick | 384/616 |
| 1,966,780 | 7/1934 | Wyrick | 384/425 X |
| 2,113,451 | 4/1938 | Leland | 384/251 |
| 2,156,706 | 5/1939 | Severn | 384/601 |
| 2,588,126 | 3/1952 | Kurtz | 384/425 |
| 2,861,847 | 11/1958 | Hinspeter | 384/425 |
| 4,153,102 | 5/1979 | Stockman | 384/264 X |
| 4,433,879 | 2/1984 | Morris | 308/244 |
| 4,533,260 | 8/1985 | Andrieux | 384/222 X |

FOREIGN PATENT DOCUMENTS

| | | | |
|---|---|---|---|
| 223753 | 10/1924 | United Kingdom | 384/425 |
| 1438027 | 6/1976 | United Kingdom | 384/420 |

Primary Examiner—Stuart S. Levy
Assistant Examiner—Thomas R. Hannon
Attorney, Agent, or Firm—Michael N. Meller

[57] ABSTRACT

A height adjusting device for machines or machine elements comprises three adjustment members positioned atop one another and together determining two sets of opposing surfaces. These surfaces allow a gyroscopic movement of the uppermost adjustment member, and the height of the height adjusting device can be adjusted stepwise, one of the two opposing surfaces in the first set of surfaces comprising one or more aligned supporting projections. These projections can cooperate selectively and tiltably with one or more recesses in a row of recesses in the second surface of the first set of surfaces. The depth of the recesses in said row of recesses varies stepwise. The surfaces of the second set of surfaces are provided with cooperating secondary projections and secondary recesses. The line on which the secondary projections are positioned forms an angle of substantially 90° with the line on which the supporting projections are positioned. The height adjusting device may for instance be used for height adjusting the sliding surface in an axial bearing in a vertical electromotor, where the end surface of the pivot on the shaft of the motor must be able to be arranged at a specific height over an upper contact surface of the electromotor, said height being encumbered with predetermined tolerances. The height adjusting device allows an easy and quick adjustment of the height and is simultaneously easy to mount. Furthermore it has the advantage that it comprises only few parts.

11 Claims, 6 Drawing Figures

HEIGHT ADJUSTING DEVICE FOR MACHINES OR MACHINE ELEMENTS

FIELD OF THE INVENTION

The invention relates to a height adjusting device for machines or machine elements, for instance, for height adjusting the sliding surface of an axial bearing in a vertical electromotor, where the end surface of the pivot on the shaft of the motor supported by the axial bearing must be capable of being arranged at a specific height over an upper contact surface on the electromotor, said height being encumbered with predetermined tolerances.

BACKGROUND ART

Immersion motors built according to the NEMA standards must be capable of absorbing the axial pressure from the pump built on top of the motor, which requires that the end surface of the pivot of the motor must be of a specific predetermined height h over a contact surface on the motor housing. An adjustment of h so as to position it within the prescribed tolerance required previously that the shaft of the motor be mounted in a particular axial bearing. The bearing portion of the latter forming the sliding surface is adjustable so as to height by means of an adjustment screw centrally positioned under the axial bearing. It is also known to adjust the pivot of the motor as to height simply by inserting thin tin plates between the axial bearing and the support thereof. Such an adjustment of the height is, however, not easy to carry out during the mounting of the motor.

SUMMARY OF THE INVENTION

The object of the invention is to provide a height adjusting device of the above type which allows a very easy adjustment of the height of a machine or a machine element such as a motor shaft, and which simultaneously is very easy to mount and comprises few parts.

The height adjusting device according to the invention is characterized in that it comprises at least three adjustment members positioned atop one another and together determining two sets of opposing surfaces, and which allow a gyroscopic movement of the uppermost adjustment member, and whereby the height of the height adjusting device and consequently, for instance, also the height of the end surface of the pivot is adjustable stepwise, one of the two surfaces of the first set of opposing surfaces comprising one or more aligned supporting projections, which can cooperate selectively and tiltably with one or more recesses in a row of recesses in the second surface of the first set of opposing surfaces. The invention is further characterized in that the depth of the recesses in said row of recesses varies stepwise, whereby the surfaces of the second set of opposing surfaces are provided with cooperating secondary projections and secondary recesses, the line along which the secondary projections lie forming an angle of substantially 90° with the line along which the supporting projections lie. In this manner it is possible to adjust the height of the height adjusting device in small steps in a very simple manner. When the height is to be slightly greater or smaller, respectively, one of the adjustment members is raised slightly, said adjustment members determining the first set of opposing surfaces. Subsequently, the adjustment member in question is slightly turned so that the supporting projections on one opposing surface engage some recesses of the other opposing surface which are positioned slightly higher or lower, respectively. Furthermore, the gyroscopic construction implies that the height adjusting device can easily absorb slight motor obliquities, if any. The height adjusting device is particularly suited for vertical electromotors, i.e. immersion motors, on top of which a pump is to be mounted. The shaft of the electromotor is then mounted on the bearing surface of an axial bearing, for instance, by means of coal shoes. An adjustment of the height of the bearing surface of the axial bearing implies that the height of the end surface of the pivot relative to an upper contact surface on the housing of the electromotor is simultaneously adjusted. Nothing, however, prevents the device from being used for horizontal motors, i.e. horizontal shafts, in which case it is, however, not a question of an "adjustment of of the height" but of an adjustment of a horizontal distance, viz. the distance between the end surface on the shaft and the contact surface on the motor housing.

According to the invention the adjustment members may be substantially cylindrical, and the supporting projections of the first set of opposing surfaces may be formed as two separate semicylinders and extend radially outwards, said supporting projections being positioned diametrally oppositely on the adjustment member in question, and the recesses cooperating with these projections in the surface situated thereabove may be specific grooves selected among a circumferentially distributed array of radially extending grooves of a minimum radius of curvature corresponding to the radius of the semicylinders. In this manner the two adjustment members determining the first set of opposing surfaces can tilt reliably relative to one another in a very simple manner.

According to the invention the depth of the recesses in the array of recesses may vary by very short steps of, for instance, 0.2 mm, which amount proves to be particularly advantageous in practice.

Furthermore, according to the invention the supporting projections for the first set of opposing surfaces may be formed as two separate hemispheres positioned diametrally opposite one another on one surface, and the corresponding recesses in the other surface may be formed by a specific pair of diametrally opposite surface portions selected among a circumferentially distributed array of such suface portions. As a result, the height adjusting device is centering automatically.

Moreover according to the invention the secondary projections of the second set of opposing surfaces may be formed as semicylinders extending radially, and the corresponding recesses of the second set of opposing surfaces may be semicylindrical and extend radially. As a result, the height adjusting device (and the axial bearing possibly built together therewith) can absorb particularly easily the oblique influences from a machine or machine element mounted on top of the height adjusting device.

According to the invention the secondary projections of the second set of opposing surfaces may be formed as two diametrally opposite hemispheres, and the corresponding recesses of the second set of opposing surfaces may be portions of surfaces or semicylindrical surfaces, whereby good possibilities for an automatic centering of the height adjusting device are obtained.

Furthermore, according to the invention the projections on the surfaces provided with projections may divide in a roof-like manner the surfaces into two joint surfaces inclining towards the projections, whereby an essential amount of material is saved.

Moreover, according to the invention the upper surface of the uppermost adjustment member may serve as bearing surface for, for instance, a cam of a shaft in an axial bearing. This embodiment of the height adjusting device is particularly advantageous.

Furthermore, according to the invention all three adjustment members may comprise a central opening. This embodiment is particularly suited for a motor, the shaft of which comprises a cam bearing, a cam on the shaft of the motor being capable of resting on the uppermost adjustment member and the shaft besides extending downwards through the adjustment members.

Finally, according to the invention at least the adjustment member provided with a bearing surface may be made of sintered material such as stainless sintered steel, cemented carbide or ceramic material. As a result, a particularly easy manufacture of complicated types of adjustment devices is obtained, as well as the latter is more resistant to corrosion.

BRIEF DESCRIPTION OF DRAWING

The invention will be described below with reference to the accompanying drawing, in which.

DESCRIPTION OF PREFERRED EMBODIMENTS

Figure 1:
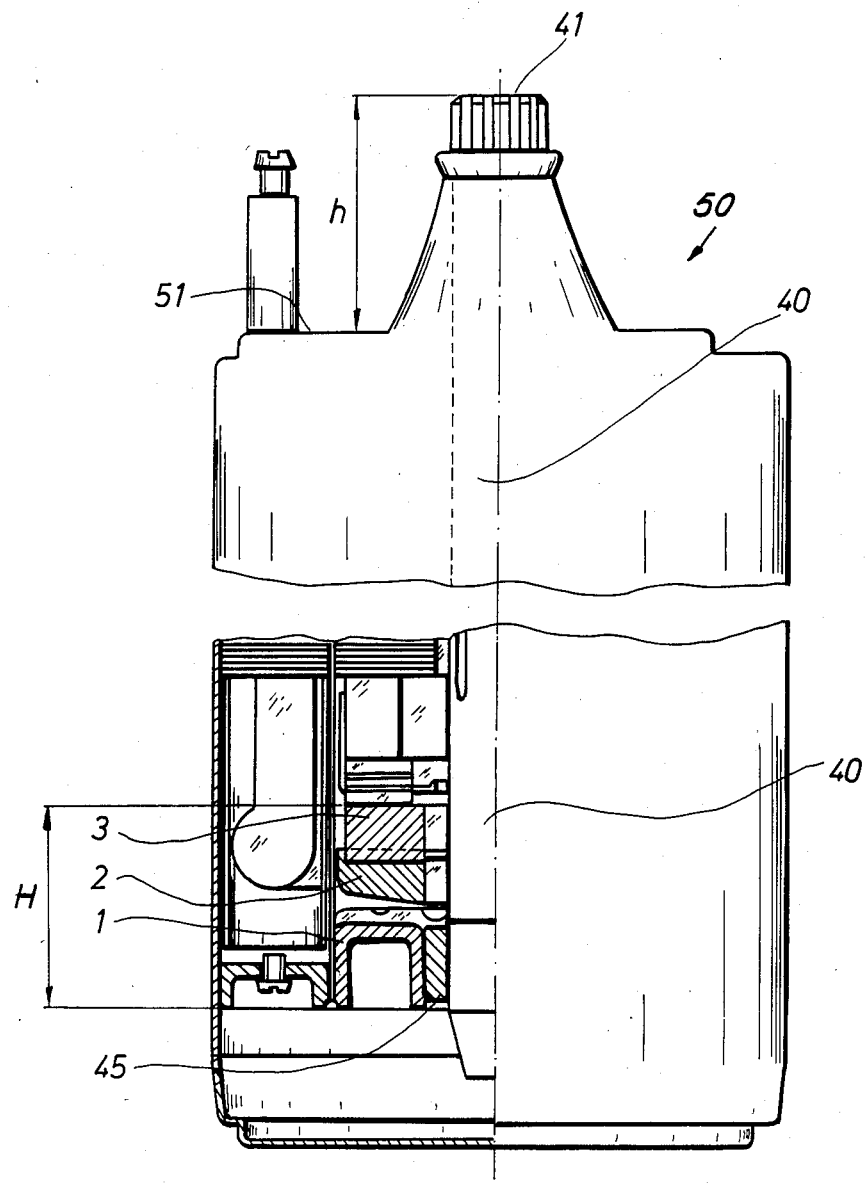
FIG. 1 is a vertical sectional view of an embodiment of the height adjusting device according to the invention, said device being used in connection with an axial bearing for an immersion motor.
Figure 2:
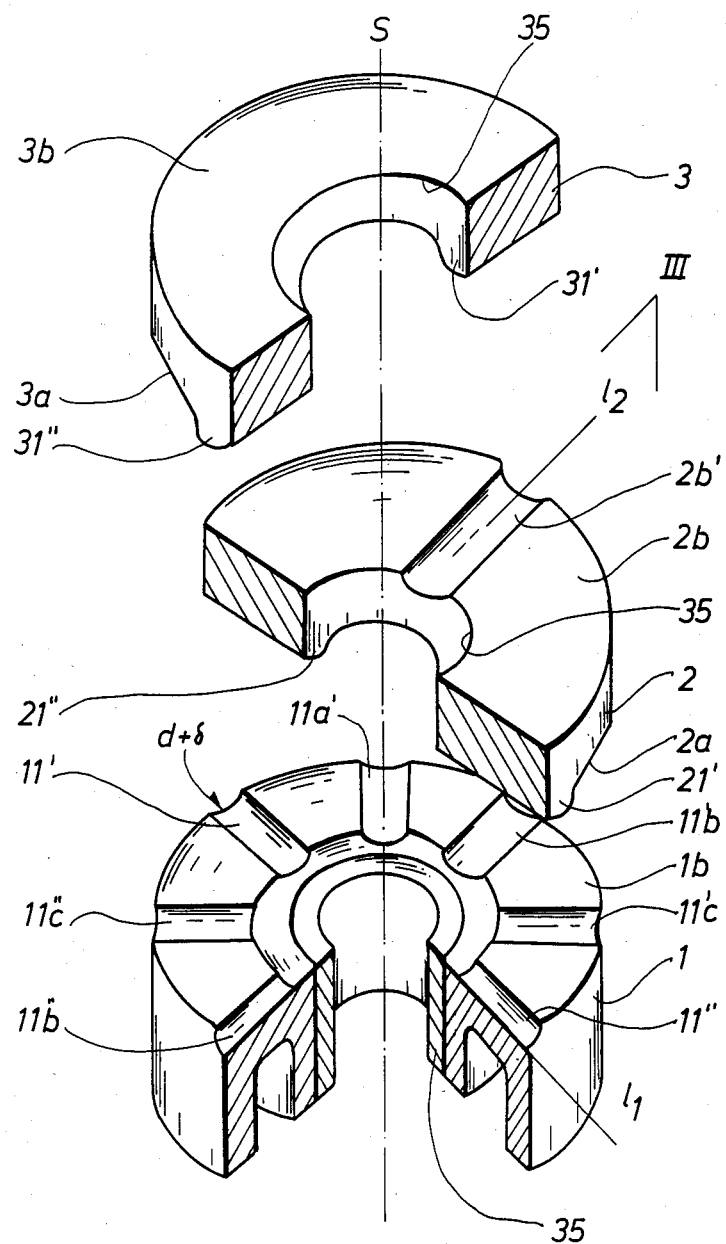
FIG. 2 is a perspective view of the height adjusting device, where the adjustment members are cut through and separated.

The height adjusting device illustrated in FIG. 1 comprises three adjustment members 1, 2 and 3 positioned atop on another and preferably being substantially circular-cylindrical. These three adjustment members are formed in such a manner that they allow a gyroscopic movement of the uppermost adjustment member, which should be understood in such a manner that the uppermost adjustment member 3 can perform a tilting movement about two lines perpendicular to each other. As illustrated in FIG. 2, the three adjustment members determine two sets of opposing surfaces. The first set of opposing surfaces is, for instance, formed by the upper surface 1b of the lowermost adjustment member 1 and the lower surface 2a of the intermediary adjustment member 2, whereas the second set of opposing surfaces is formed by the upper surface 2b of the intermediary adjustment member 2 and the lower surface 3a of the uppermost adjustment member 3.

As illustrated in FIG. 2, the surface 2a comprises aligned supporting projections 21' and 21". When the adjustment member 1 does not comprise a central opening, only a single projection can be provided instead of two projections. Nothing, however, prevents the surface from comprising more than two projections, provided said projections are aligned. The supporting projections 21' and 21" cooperate with two corresponding recesses, such as grooves 11' and 11", formed in the upper surface 1b of the lowermost adjustment member 1. An array of circumferentially distributed radial recesses, i.e. grooves 11'a, 11"a, 11'b, 11"b, 11'c, 11"c, 11', 11", can be provided in the surface 1b, and the depth of these recesses may vary in a stepwise manner. For instance, when the recesses 11'c, 11"c are of depth d, the recesses 11', 11" are of depth d+δ, where δ is a very small distance, for instance, 0.2 mm, whereas the recesses 11'b, 11"b are of depth d−δ and the recesses 11'a and 11"a are of depth d−2δ. Note that groove 11'a is not shown in FIG. 2 because that portion of lowermost adjustment member 1 has been cut away.

In dependence on the height of the upper surface 3b of the uppermost adjustment member 3, the intermediate adjustment member 2 is rotated into a position allowing the projections 21' and 21" to cooperate with two aligned recesses in surface 1b at a suitable height. It is noted in connection with the second set of opposing surfaces i.e., the lower surface 3a of the uppermost adjustment member 3 and the upper surface 2b of the intermediary adjustment member 2, that the surface 3b can be provided with secondary projections 31', 31". The latter projections, are aligned. Instead of two projections merely one projection can be provided when the adjustment members comprise no central opening. More than two projections may also be present provided they are aligned. The secondary projections can cooperate with secondary recesses 2b', only one projection appearing from FIG. 2 where several projections can be present. When all the adjustment members 1, 2, and 3 are assembled, the line $l_2$—about which the secondary projections 31', 31" may tilt—forms an angle of substantially 90° with the line $l_1$ about which the supporting projections 21', 21" may tilt.

FIG. 2 clearly shows how the projections 21' and 21" can be semicylindrical and extend radially outwards as they are positioned diametrally opposite relative to the axis of symmetry s of the adjustment members. The recesses 11'a, 11"a, 11'b, 11"b, 11'c, 11"c, 11', 11" in the surface 1b can be formed as radially extending grooves of a minimum radius of curvature corresponding to the radius of the semicylinders 21' and 21".

Figure 4:
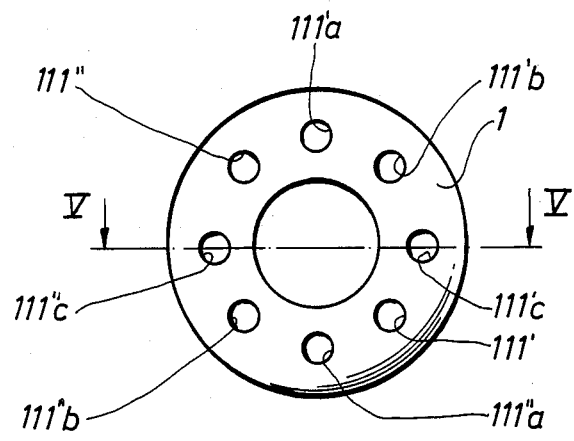
FIG. 4 is a top view of a particular embodiment of the lower adjustment member, where the recesses cooperating with the supporting projections are portions of surfaces.
Figure 5:
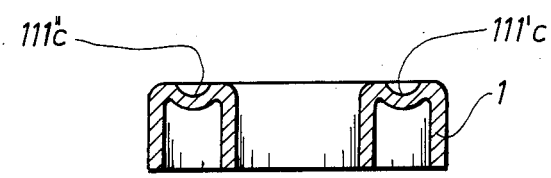
FIG. 5 is a vertical view taken along the line V—V of FIG. 4 of the embodiment of FIG. 4.
Figure 6:
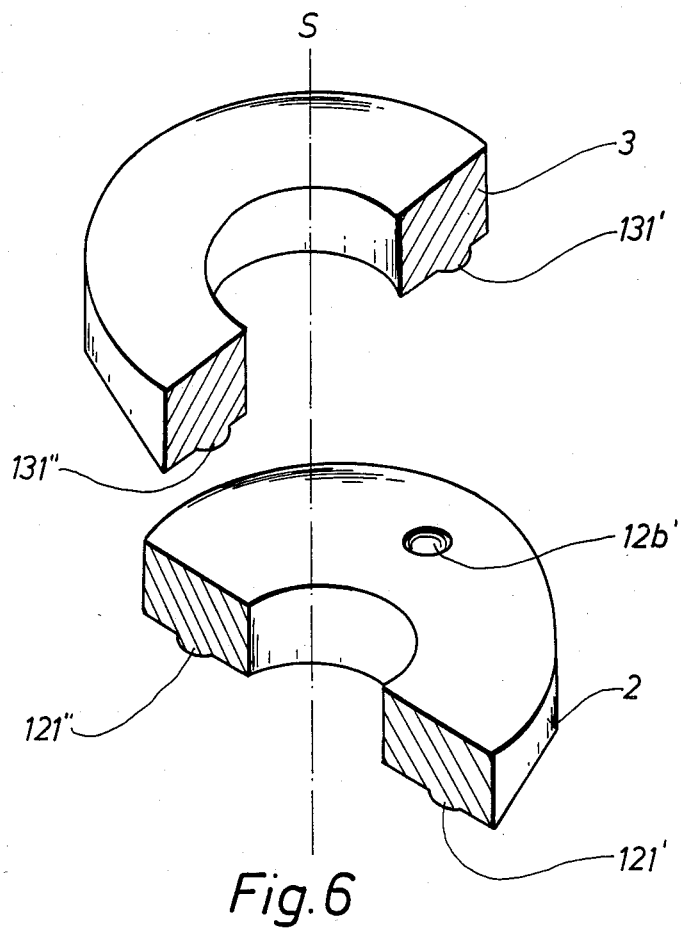
FIG. 6 illustrates an embodiment of the height adjustment device corresponding to FIG. 2, but whereby the supporting projections and the secondary projections are hemispheres.

FIG. 6 illustrates how the supporting projections at the first set of opposing surfaces can be formed as separate hemispheres 121', 121", whereas FIG. 4 illustrates how the corresponding recesses in the surface 1b then are a specific pair of diametrally opposing surface portions selected from among a circumferentially distributed array of such surface portions 111'a, 111"a, 111'b, 111"b, 111'c, 111"c, 111', 111". These pairs of surface portions have a depth slightly increasing in the same manner as described in connection with the recesses 11'a etc. of FIG. 2.

In connection with the second set 3a, 2b of opposing surfaces, secondary projections 31' and 31" are provided on the surface 3a, said secondary projections being formed as semicylinders, cf. FIG. 2, extending radially. The corresponding recesses 2b' in the surface 2b can be semicylindrical and also extend radially. The recess 2b' and the corresponding recesses extending symmetrically about the line possess preferably a radius of curvature which is slightly greater than the radius of the semicylinders 31' and 31".

As illustrated in FIG. 6, the secondary projections 131' and 131" on surface 3a can be formed as hemispheres symmetrically positioned relative to the axis of symmetry s. These hemispheres can cooperate with recesses formed in surface 2b, only one recess 12b' being illustrated as the second opposing recess is located on the cutaway portion. The radius of curvature of the recess 12b' is slightly greater than the radius of curvature of the hemispheres 131' and 131".

Figure 3:
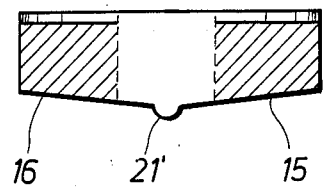
FIG. 3 is a vertical view taken along the line III—III of FIG. 2 of the intermediary adjustment member.

FIG. 3 illustrates how the projections, i.e. both the supporting projections and the secondary projections, on the surfaces provided with projections, e.g. the surfaces 2a, 3a, can divide in a roof-like manner the surfaces into two joint surfaces 15 and 16 inclining towards the projections 21' and 21".

As illustrated in FIG. 2 the upper surface 3b of the uppermost adjustment member 3 is wear-resisting and can serve as an axial bearing.

FIG. 2 illustrates furthermore how all three adjustment members 1, 2, and 3 can comprise a central opening 35 of the same diameter, whereby a shaft 40 in the machine to be supported by the height adjusting device can optionally pass through the adjustment members as the shaft then may comprise a cam cooperating with the upper surface 3a of the adjustment member 3.

The entire adjustment member 3 or merely the upper layer thereof can be made of sintered material such as stainless sintered steel, hard metal or ceramic material, whereby the axial surface 3b is extremely wear-resisting.

As illustrated in FIG. 1 the height adjusting device is particularly suited for mounting in an immersion motor 50, on top of which a centrifugal pump is to be connected. The NEMA standards require that the height h from an upper contact surface 51 on the motor to an end surface 41 of the pivot of the motor shaft 40 be of a quite specific size. As the lower end of the motor shaft 40 is mounted in an axial bearing on the uppermost adjustment member 3, i.e. actually on the bearing surface 3b of the member 3, in the height adjusting device, the surface 41 can be adjusted as to height, the total height of the adjusting device being adjustable, whereby h will have the height prescribed by the tolerances. A slide bearing 45 may, for instance, be mounted in the opening of the adjustment member 1, cf. FIG. 1, said slide bearing serving as a radial bearing for the shaft 40.

The invention may be varied in many ways without thereby deviating from the scope thereof.

We claim:

1. A height adjusting device for machines or machine elements, for height adjusting a sliding surface of an axial bearing in a vertical electromotor, where an end surface of a pivot on a shaft of said motor supported by said axial bearing must be arranged at a specific height h above an upper contact surface on a said electromotor, said height h being selected in according with predetermined tolerances, said height adjusting device comprising first, second and third adjustment members arranged in a stack of height H, each adjustment member having a top surface and a bottom surface, said adjustment members being stacked such that said bottom surface of said second adjustment member opposes said top surface of said first adjustment member to form a first set of opposing surfaces and said bottom surface of said third adjustment member opposes said top surface of said second adjustment surface to form a second set of opposing surfaces, wherein one of said first set of opposing surfaces has at least one supporting projection formed thereon and the other of said first set of opposing surfaces has first and second recesses formed therein, said first recess having a maximum depth less than the maximum depth of said second recess by a predetermined amount, said first and second recesses being arranged to receive said one supporting projection, said one supporting projection being adapted to cooperate with a selected one of said recesses to enable tilting of said second adjustment member relative to said first adjustment member about a first axis along which said one supporting projection is arranged, and wherein one of said second set of opposing surfaces has at least one secondary projection formed thereon and the other of said second set of opposing surfaces has at least one secondary recess formed therein, said one secondary projection being adapted to cooperate with said one secondary recess to enable tilting of said third adjustment member relative to said second adjustment member about a second axis along which said one secondary recess is arranged, said first axis being substantially perpendicular to said second axis, whereby said third adjustment member is capable of gyroscopic movement, and said heights h and H are stepwise adjustable.

2. The height adjusting device as defined in claim 1, wherein said other of said first set of opposing surfaces further has third and fourth recesses formed therein, said third and fourth recesses being arranged to receive said one supporting projection, said third recess having a maximum depth greater than the maximum depth of said second recess by said predetermined amount, and said fourth recess having a maximum depth greater than the maximum depth of said third recess by said predetermined amount.

3. The height adjusting device as defined in claim 2, wherein said predetermined amount equals about 0.2 mm.

4. The height adjusting device as defined in claim 1, wherein each adjustment member has a substantially cylindrical surface connecting said top and bottom surfaces, said one of said first set of opposing surfaces has first and second radially directed and diametrally opposed supporting projections formed as semicylinders of predetermined radius thereon, and said other of said first set of opposing surfaces has a plurality of pairs radially directed and diametrally opposed recesses formed therein, each of said recesses having a minimum radius of curvature substantially equal to said predetermined radius.

5. The height adjusting device as defined in claim 4, wherein said one of said second set of opposing surfaces has first and second radially directed and diametrally opposed secondary projections formed as semicylinders thereon, and said other of said second set of opposing surfaces has a plurality of pairs of radially directed and diametrally opposed recesses formed therein.

6. The height adjusting device as defined in claim 5, wherein said bottom surfaces of said second and third adjustment members each comprise first and second planar surfaces which extend from said supporting and secondary projections respectively at an incline relative to a radial plane, said first and second planar surfaces forming an angle of less than 180°.

7. The height adjusting device as defined in claim 1, wherein said one of said first set of opposing surfaces has first and second diametrally opposed supporting projections formed as hemispheres of predetermined radius thereon, and said other of said first set of opposing surfaces has a plurality of pairs of diametrally opposed recesses formed therein, each of said recesses having a minimum radius of curvature substantially equal to said predetermined radius.

8. The height adjusting device as defined in claim 7, wherein said one of said second set of opposing surfaces has first and second diametrally opposed supporting projections formed as hemispheres thereon, and said other of said second set of opposing surfaces has a plurality of pairs of diametrally opposed recesses formed therein.

9. The height adjusting device as defined in claim 1, wherein said top surface of said third adjustment member serves as a bearing surface for a cam of said shaft of said axial bearing.

10. The height adjusting device as defined in claim 1, wherein each of said adjustment members has a central opening.

11. The height adjusting device as defined in claim 1, wherein said top surface of said third adjustment bearing is made of a material taken from the group consisting of stainless sintered steel, cemented carbide and ceramic.

* * * * *